US008681786B2

(12) United States Patent
Shen et al.

(10) Patent No.: US 8,681,786 B2
(45) Date of Patent: Mar. 25, 2014

(54) CENTRALIZED RECORDING AND PROCESSING OF RECEIVED PACKET PARAMETERS

(75) Inventors: Qiang Shen, San Diego, CA (US); Tarun Tandon, San Diego, CA (US); Alon Saado, San Diego, CA (US)

(73) Assignee: Via Telecom Co., Ltd., George Town (KY)

( * ) Notice: Subject to any disclaimer, the term of this patent is extended or adjusted under 35 U.S.C. 154(b) by 745 days.

(21) Appl. No.: 12/701,694

(22) Filed: Feb. 8, 2010

(65) Prior Publication Data

US 2011/0194555 A1   Aug. 11, 2011

(51) Int. Cl.
*H04L 12/56* (2011.01)
(52) U.S. Cl.
USPC .......................................................... 370/389
(58) Field of Classification Search
USPC .......................................... 370/232, 389, 392
See application file for complete search history.

(56) References Cited

U.S. PATENT DOCUMENTS

| | | | |
|---|---|---|---|
| 6,466,545 B1 * | 10/2002 | Watanabe | 370/232 |
| 2008/0232442 A1 * | 9/2008 | Rodbro et al. | 375/211 |
| 2009/0154568 A1 * | 6/2009 | Chuang et al. | 375/240.25 |

FOREIGN PATENT DOCUMENTS

CN   101184000   5/2008

OTHER PUBLICATIONS

English language translation of abstract of CN 101184000 (published May 21, 2008).

* cited by examiner

*Primary Examiner* — Dang Ton
*Assistant Examiner* — Kevin Lee
(74) *Attorney, Agent, or Firm* — McClure, Qualey & Rodack, LLP (57) ABSTRACT

The invention relates to an internet application flow rate identification method based on message sampling and application signing, comprising the following steps: firstly, message sampling capture: in accordance with sampling strategy and sampling rate the message is captured and decoded; secondly, decoding: the flow information and application data of the message is analyzed by decoding the message; thirdly, flow classification: according to the flow information of the message, a flow state table is found and maintained; fourthly, flow state distinguishing: the signature is matched if the application type of the flow state found through the flow classification is unknown; finally, signature matching: according to the application signature bank, the application data of the message is matched, if matched successfully, the application type of the flow state is updated, and the flow information and application type of that data stream is output. The method is of high accuracy in identification, high efficiency in processing, good expandability, high possibility in realization, and is applicable not only for message processing, but also for flow data analysis. The invention can be achieved in not only the network equipment, but also the network analysis system.

18 Claims, 13 Drawing Sheets

| info_vld pckt_vld | bcmcs | MACIndex | DRC | EPSize | FCS Type | SlotCnt | TimeStmp | CRC | SOP | PktCmp |
|---|---|---|---|---|---|---|---|---|---|---|
| 2 bit | 1 bit | 7 bit | 4 bit | 3 bit | 1 bit | 4 bit | 6 bit | 1 bit | 1 bit | 1 bit |

CENTRALIZED RECORDING AND PROCESSING OF RECEIVED PACKET PARAMETERS

BACKGROUND OF THE INVENTION

1. Field of the Invention

The invention generally relates to packet parameters processed at a receiving end of a data communication system, and more particularly, to centralized recording and processing of received packet parameters.

2. Description of the Related Art

For a packet-based or frame-based data communications system, such as a 1x Code Division Multiple Access 2000 (1x CDMA 2000) system, a 1x Evolution-Data Optimized (1x EVDO) system, an IEEE 802.11a/b/g system, and a Long Term Evolution (LTE) system, etc., the packets or frames communicating in the system on physical layers can be one of several types. Each type of packets or frames are defined by an underlying set of physical layer parameters, e.g. modulation type, coding type and rate, payload data rate, packet or frame duration, type of information being carried, number of users being addressed to, etc. The underlying set of parameters can dynamically change from packet to packet (or from frame to frame). A mechanism is typically adopted in a receiver of a packet-based or frame-based communications system to ensure that all of the parameters needed for decoding and post-processing of a packet (frame) are either dynamically made available to the receiver as the packet (frame) is being processed, or generated as part of the decoding process itself. Furthermore, status/quality information may be generated as part of the packet (frame) decoding process. Generally, the parametric information associated with a received packet (frame) can be categorized into at least 3 groups: 1). characterization parameters for that packet (frame) known beforehand, 2). characterization parameters discovered as part of the packet receiving process at physical layer, and 3). decoding status and/or packet (frame) quality information available after completion of reception and decoding of that packet (frame) at physical layer.

In addition, many packet (frame)-based data communications systems are designed to fragment a packet (frame) into smaller quanta and transmit each individual quantum associated with that packet (frame) in an interlaced manner with quanta associated with other packets (frames). The number of packets (frames) being thus interlaced can be different among various data communications systems, and is generally defined by the standard corresponding to the associated data communications system. For such an interlaced packets (frames) structure, some of the characterization parameters may stay the same from one quantum to another quantum of the fragmented packet (frame), while others may dynamically change with each quantum of the fragmented packet (frame). At the receiver end of a packet (frame)-based data communications system, higher layered information processing entities typically use the parametric information of the quantum of the packet (frame) provided by the physical layer to determine a next course of action for a payload data, as well as to generate performance metrics (packet or frame error rate, quality of reception, etc.) for the underlying physical layer.

Figure 1:
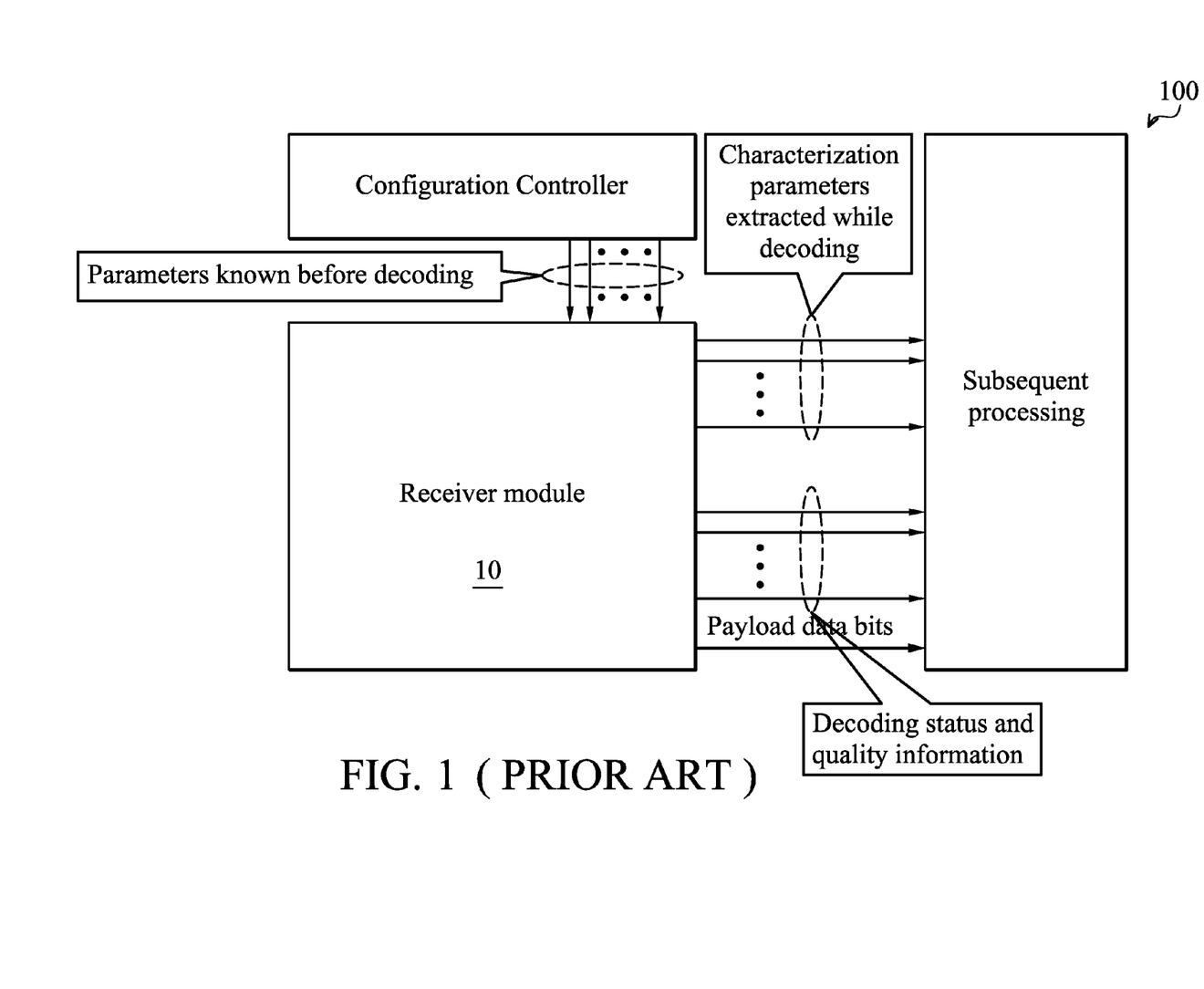
FIG. 1 is a block diagram illustrating a conventional receiver of a generic data communications system.

FIG. 1 is a block diagram illustrating a conventional receiver of a generic data communications system. In a receiver 100, the known-beforehand characterization parameters of the received packet (frame) or fragmented quantum thereof are transferred to a physical layer receiver module 10 in the physical layer. After a packet (frame) is received by the physical layer receiver module 10, other characterization parameters are discovered during the packet (frame) receiving process and status/quality information is generated. The physical layer receiver module 10 then transfers the discovered characterization parameters and the status/quality information, along with payload data, to other parts or higher layers of the receiver 100 for subsequent processing. Note that the parametric information from the physical layer receiver module 10 is individually maintained and separately communicated to the other parts or higher layers of the receiver 100. Thus, the higher layers of the receiver 100 must perform synchronization, maintenance, and sorting of the parametric information before the parametric information can be used. However, the distributed nature of the parametric information may result in inefficiencies in time and/or space when information is extracted. Specifically, information is inefficiently extracted by various parts of the receiver 100 when parameters to process associated payload data and/or generate physical-layer quality metrics are required. This is because each of the other parts or higher layers of the receiver 100 would have to read all of the individual pieces of parametric information one by one, associate them with current interlace being processed, and keep them synchronized to the system time reference, thereby requiring extra processing resources, e.g. clock-cycles required for processing, read and storage. This lowers data-delivery throughput in high data-rate data communications systems; especially for those that interlace different types of packet (frame) streams on underlying physical links. Also, this may result in a complex debugging process due to lack of availability of compact information about a given packet (frame) stream being debugged.

BRIEF SUMMARY OF THE INVENTION

Accordingly, embodiments of the invention provide centralized recording and processing of received packet parameters. In one aspect of the invention, a receiver for maintaining parameters of packets received from a transmitter is provided. The receiver comprises a first module, a record generating module, a buffering module, and a second module. The first module receives packets from the transmitter and decodes the packets to obtain corresponding payload data, wherein each received packet is transmitted in accordance with a first set of parameters predetermined before decoding of the packets, a second set of parameters which are dynamically determined when the packets are being decoded, and a third set of parameters which are determined after the packets have been decoded. The record generating module generates a record for each received packet, wherein the record comprises the first set, the second set, and the third set of parameters. The buffering module stores the record and corresponding payload data of each received packet. The second module retrieves the record and corresponding payload data from the buffering module, and processes the corresponding payload data according to the record.

In another aspect of the invention, a method for a receiver to maintain parameters of packets received from a transmitter is provided. The method comprises receiving packets from the transmitter and decoding the packets to obtain corresponding payload data, by a receiving module, wherein each received packet is transmitted in accordance with a first set of parameters predetermined before decoding of the packets, a second set of parameters which are dynamically determined when the packets are being decoded, and a third set of parameters which are determined after the packets have been decoded. A record for each received packet is generated, wherein the record comprises the first set, the second set, and the third set of parameters. The record and corresponding payload data of each received packet is stored, wherein the record and corresponding payload data is retrieved and the corresponding payload data is processed according to the record, by at least one subsequent processing module.

Other aspects and features of the invention will become apparent to those with ordinarily skilled in the art upon review of the following descriptions of specific embodiments of the methods for a receiver to maintain parameters of packets received from a transmitter, and receivers thereof.

BRIEF DESCRIPTION OF DRAWINGS

The invention can be more fully understood by reading the subsequent detailed description and examples with references made to the accompanying drawings, wherein:

FIG. 6A to 6E is a block diagram illustrating the packet record buffers according to the embodiment shown in FIGS. 3A and 3B;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
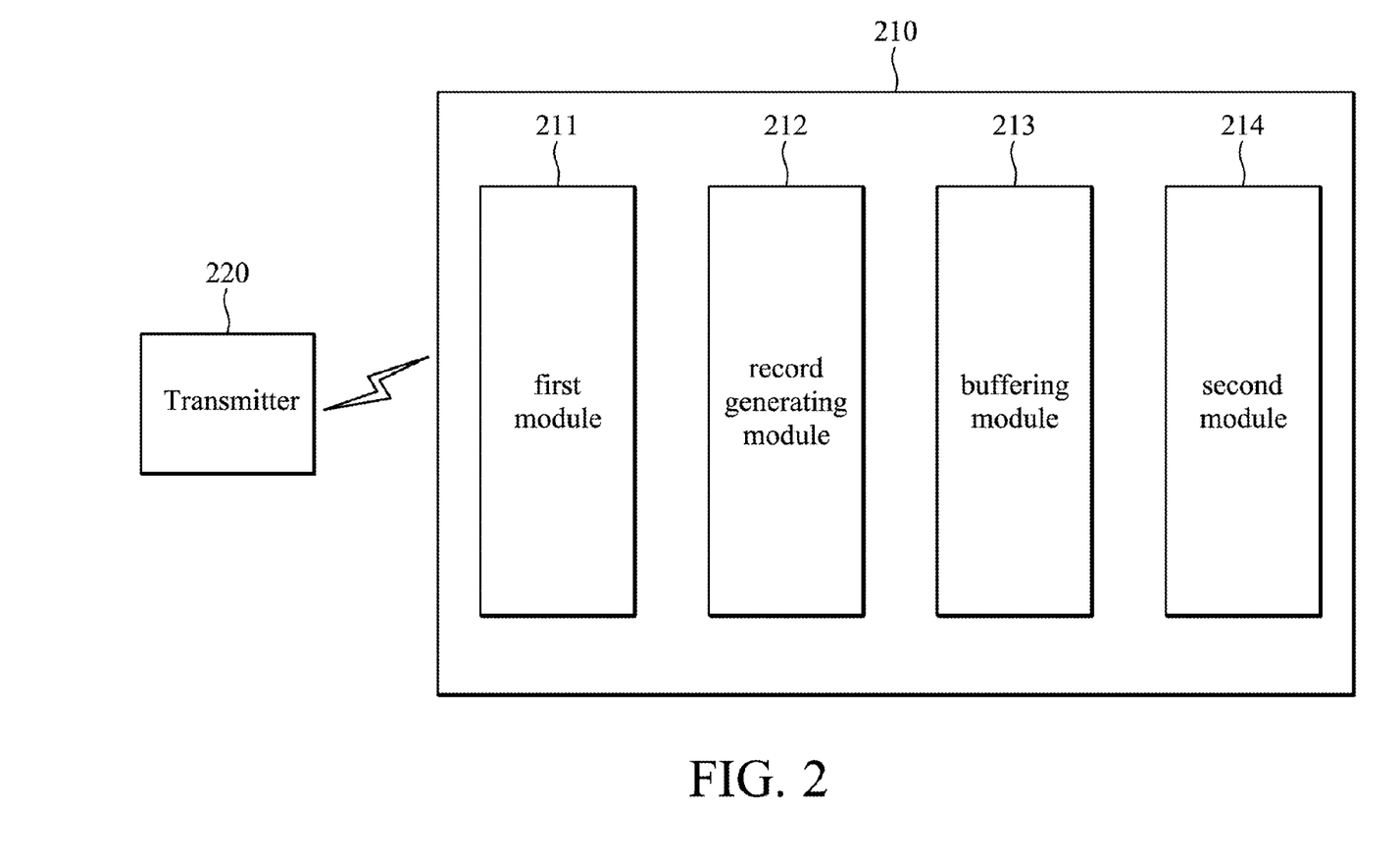
FIG. 2 is a block diagram illustrating a receiver of a data communications system according to an embodiment of the invention.

The invention provides a centrally synchronized structure to simplify maintenance, storage, and extraction of parametric information of each received packet (frame) or fragmented quantum thereof in an interlaced system. FIG. 2 is a block diagram illustrating a receiver of a data communications system according to an embodiment of the invention. As shown in FIG. 2, a receiver 210 is provided for maintaining parameters of packets received from a remote transmitter 220. The transmitter 220 may be located in a certain distance from the receiver 210, and wirelessly connected with the receiver 210 via an air interface. The receiver 210 comprises a first module 211, a record generating module 212, a buffering module 213, and a second module 214. The first module 211 receives packets from the transmitter 220, and then decodes the packets to obtain corresponding payload data. Note that each of the received packet is transmitted in accordance with a plurality of parameters, including a first set of parameters predetermined before decoding of the packets, a second set of parameters which are dynamically determined when the packets are being decoded, and a third set of parameters which are determined after the packets have been decoded. After the packets are decoded, the record generating module 212 generates a record for each received packet, wherein the record comprises the first set, the second set, and the third set of parameters. Subsequently, the record of each received packet is stored in the buffering module 213 for subsequent processing. In addition to storing the records, the buffering module 213 also stores the corresponding payload data of each received packet. As a beneficial result, the second module 214 can retrieve the record and corresponding payload data of each received packet from the buffering module 213, and processes the corresponding payload data according to the record when necessary. Specially, all the parameters associated with a received packet are already collected in a corresponding record.

Figure 3:
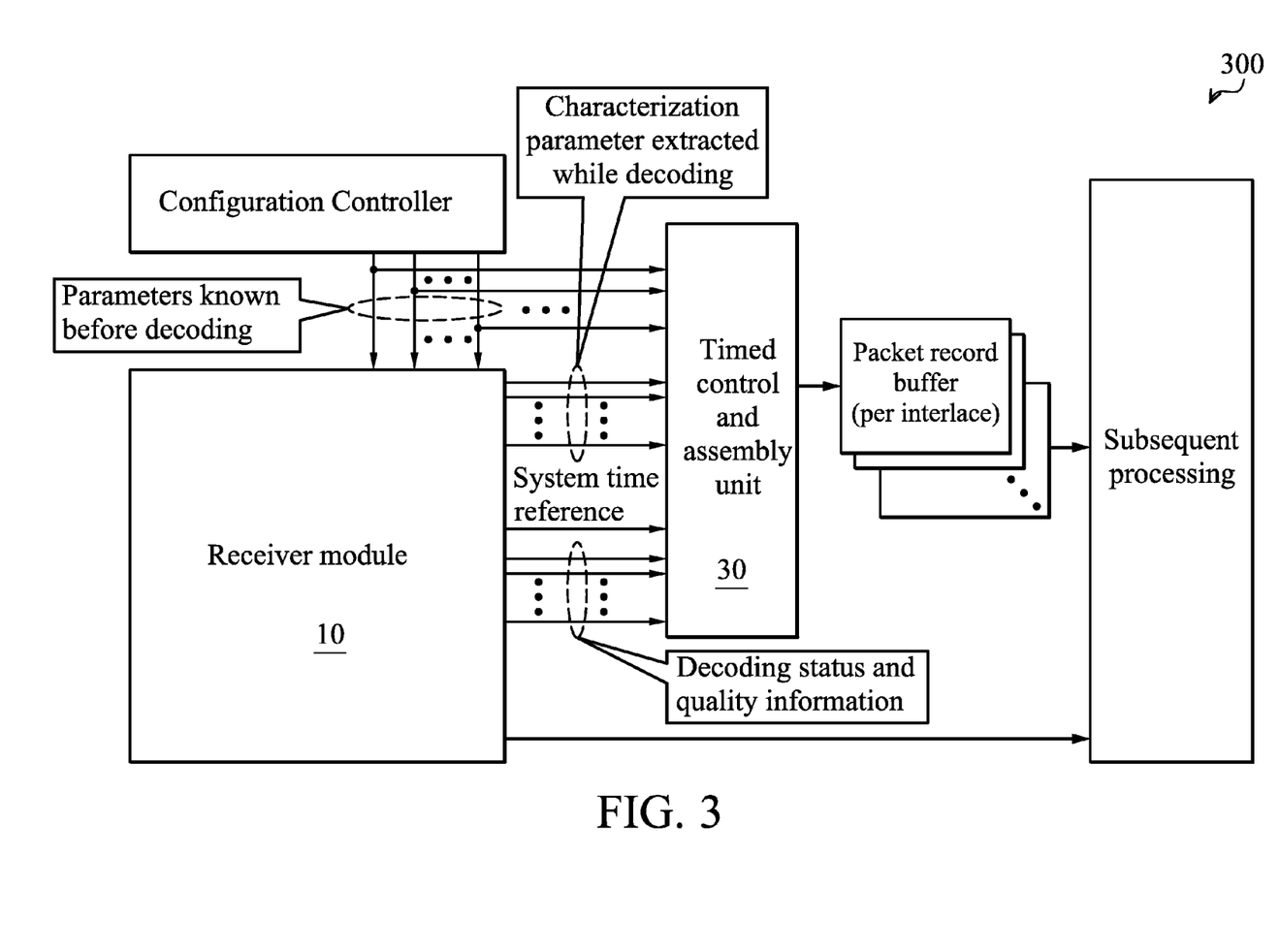
FIG. 3 is a block diagram illustrating a receiver of a generic data communications system according to another embodiment of the invention.

FIG. 3 is a block diagram illustrating a receiver of a generic data communications system according to another embodiment of the invention. In a receiver 300, packets (frames) are received and decoded by a physical layer receiver module 10. The characterization parameters and the status/quality information generated from the decoding process, along with a system time reference, are transferred to a timed control and assembly unit (TCAU) 30. In addition, the known-beforehand characterization parameters of the received packet (frame) or fragmented quantum thereof are also transferred to the TCAU 30. Next, the TCAU 30 generates necessary timing signals to extract and assemble all of the desired parametric information associated with the received packet (frame) or its fragmented quantum of current interlace into a compact record, which is referred to as a "packet record" or a "frame record" herein. Furthermore, the packet record is time-stamped using the system time reference to help other parts or higher layers of the receiver 300 to identify and use the parametric information of that received packet (frame) or its fragmented quantum. The time stamping further helps with identifying the associated interlace of the packet's (frame's) quantum in a system using interlaced data-streams on the underlying physical link. All of the static and dynamically extracted parameters associated with the packet (frame), or its fragmented quantum being decoded are compactly stored within the packet record. The extraction of the parametric information is based on certain input signals, such as slot boundary indicators of packets or their fragments. In an interlaced system, some of the characterization parameters may be needed only after a specified fragment of the packet has been received, while some other parameter(s) may require continual updating as subsequent fragments of the packet are received, and yet other parameter(s) may be required for processing of some of the fragments and not for other fragments of the packet. Accordingly, the TCAU 30 may output multiple packet records, one for each interlace, which may be further buffered per interlace for subsequent processing. Because of this compact availability of all parametric information associated with a received packet in a packet record, the other parts or higher layers of a system, which perform subsequent processing on the received packets, can efficiently read the entire record in fewer clock cycles than it would take to generate and read all of the parametric information individually as in the conventional receiver, and can further determine a next course of action to take on a packet's payload data. Moreover, availability of this snapshot of the parametric information simplifies any required debugging processes.

Note that the receiver in FIG. 1 is generic for all data communications systems, while the TCAU 30 is a system dependent design since different data communications systems may have different parametric information of the received packet or its fragmented quantum. Take a CDMA2000 1xHRPD (EVDO, rel-0, or A) system for example. The cdma2000 1xHRPD system's forward link (base station to mobile station) is designed to communicate data packets of varying lengths, from 128 bits to 5120 bits, fragmented in smaller sizes so as to fit within a "slot" of 1.6667 msec duration. Thus, each packet is fragmented into a number of slots standardized for the different available link data-rates, and further, those slots are sent over the physical link in an interlaced manner along with slots from other packets. Transmission of each packet starts with a preamble of standardized length that can be used by the receiver to detect a start and/or presence of the packet, as well as to detect the underlying user index that the packet is meant for. The underlying user index of a packet determines if the packet type is a single user specific packet, or a packet addressed to multiple users, or if the packet is a control packet broadcasted to all of the active users in the system. The cdma2000 1xHRPD system uses an interlace structure of four interlaces for one packet. The data-rates selected for the packets addressed to a single or multiple users are determined by the data-rate requested from the mobile-station. The mobile station periodically requests for one of the standardized data-rates from the sender based on the quality of the channel as determined by its receiver.

At the end of each slot, the receiver module of the mobile station attempts to decode each of the packets based on the slots received so far from the sender and sends a positive or negative acknowledgement back to the sender to indicate whether the decoding of the packet was successful or not. If a packet is successfully decoded before all of the slots associated with the packet have been transmitted, upon receiving a positive acknowledgement from the receiver, the sender may choose to discontinue transmission of the remaining slots of the decoded packet and start a new packet in the interlace that was being used for the decoded packet.

Figure 4A:
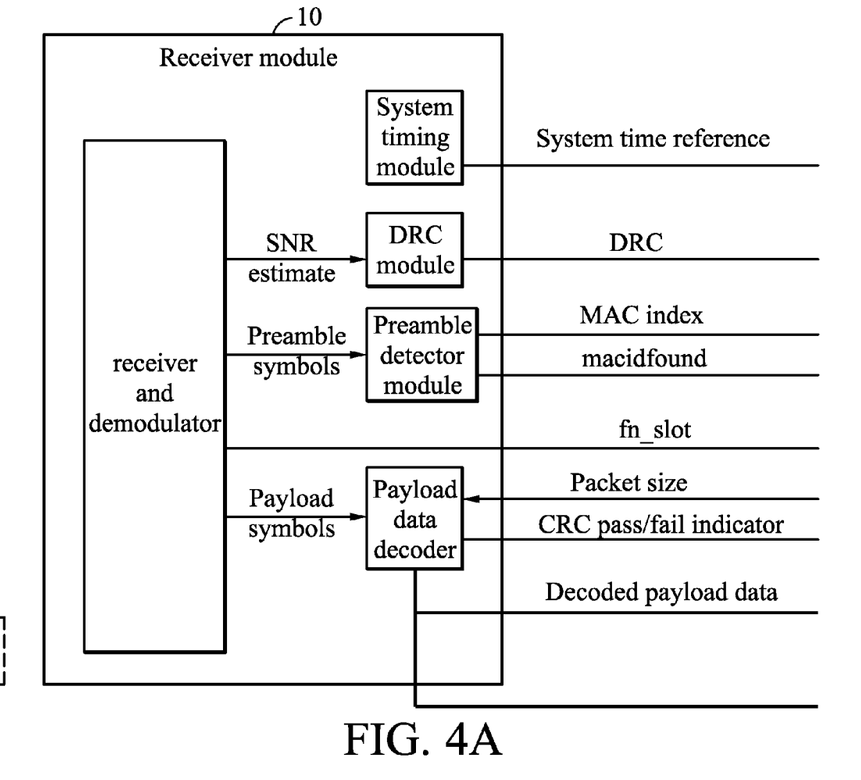
FIGS. 4A and 4B is a block diagram illustrating a receiver of a CDMA2000 1xHRPD system according to an embodiment of the invention.
Figure 4B:
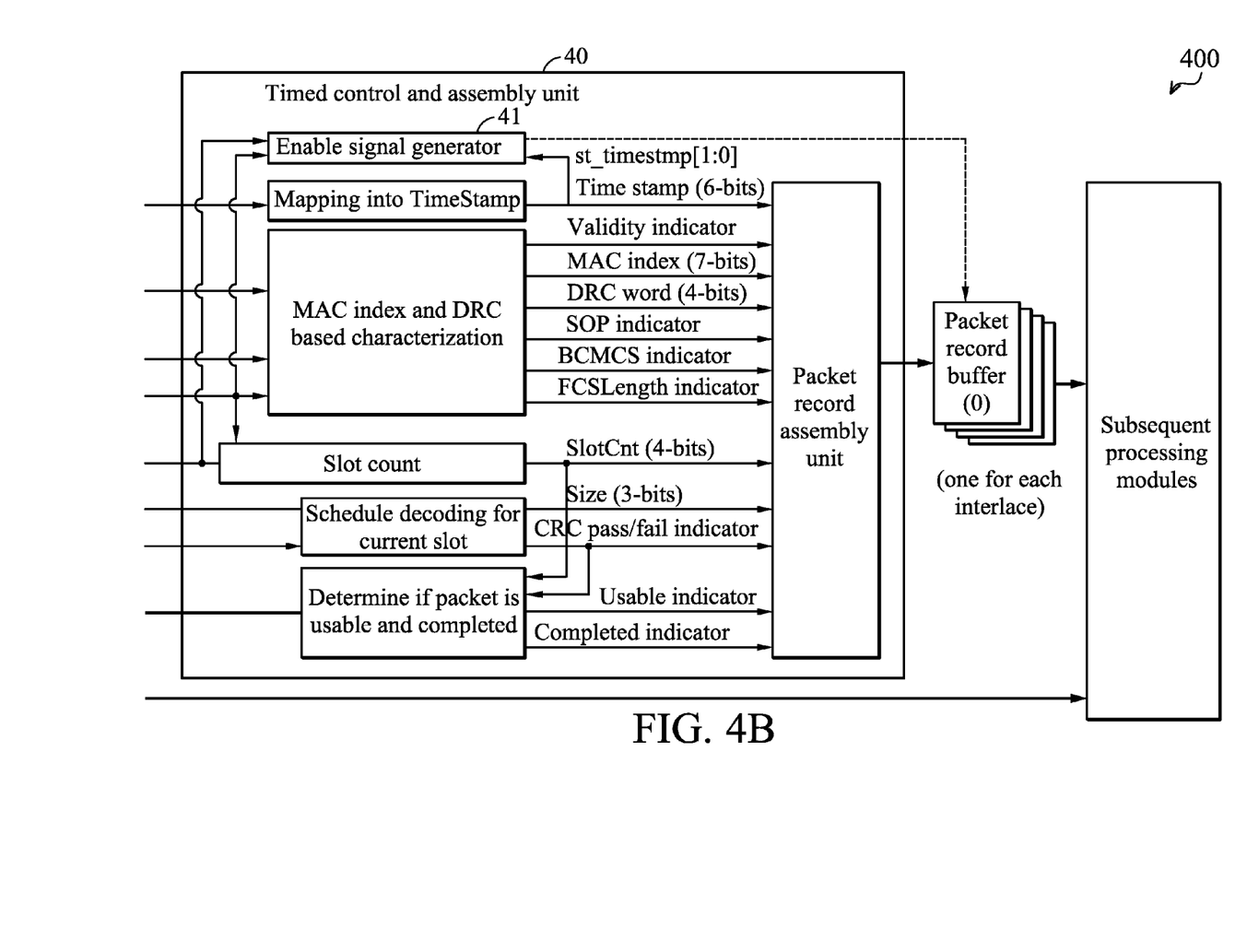

FIGS. 4A and 4B is a block diagram illustrating a receiver of a CDMA2000 1xHRPD system according to an embodiment of the invention. In the receiver 400, the system time forms one of the two pieces of information known beforehand, i.e. information known before the received packet or fragmented quantum is processed. One piece of information known beforehand indicates which of the four interlaces is being received in any given slot. The other piece of information known beforehand is the data-rate format that was requested by the mobile station for the slot based on channel quality estimation. This information is termed as data-rate control (DRC) information and is four-bits wide to accommodate all of fifteen possible packet formats. At the end of every slot, the mobile station receiver estimates the channel quality from received signals in the slot, and selects an appropriate data-rate for likelihood of robust error-free reception of a packet in a next slot. Although the information is sent back to the base station for every slot, the base station uses the information to select the right packet format for the requested data-rate only at the beginning of a packet transmission in an interlace, and ignores any requested DRC information during subsequent fragment transmissions of a packet. Therefore, for a given packet, the DRC information remains the same for all of the constituent fragments. The TCAU 40 assures that the DRC information is saved into the packet record only for the slot in which start of a packet is detected, and the DRC information remains the same for any of the constituent slots of the packet, even though the requested DRC information being generated by the receiver may change for every slot.

The packet which may be received in any slot is further characterized by the receiver from the following pieces of information extracted during the decoding process: (a) an underlying media access control (MAC) index of the packet, as detected from the preamble of the packet by the receiver, which is a seven bit value to support up to 128 possible indices; (b) a fragment (slot) number within the packet; (c) a type of forward checksum (FCS) for the packet, which is 16-bit or 24-bit long; (d) an indicator for indicating whether the packet is a Broadcast-Multicast (BCMCS) type, and (e) a start-of-packet (SOP) indicator for indicating whether a given slot is the slot in which the packet was started, i.e., the very first slot of the packet. Note that while the information pieces (a), (c) and (d) stay the same for all slots of the packet sent by the base station, the information pieces (b) and (e) may change from slot to slot (fragment to fragment) within the packet. In addition, all of the pieces of information can change from interlace to interlace, since each interlace may be carrying an entirely different kind of packet.

After the physical layer receiver module 10 completes the packet decoding procedure in a given slot, the following pieces of additional information associated with the packet are made available: (i) a cyclic redundancy check (CRC) pass/failure indicator for indicating whether CRC checksum has passed or failed; (ii) a packet completed indicator for indicating whether the packet span is completed, i.e. if all of the possible slots in the packet have been received from the sender, or if the packet is successfully decoded with fewer slots; (iii) the actual size of the packet received; (iv) a usable packet indicator for indicating if the packet is a usable packet, i.e., if the packet is not meant for this user or is a redundant transmission by the sender; and (v) a packet valid indicator for indicating whether the packet record being maintained for the slot is valid, e.g. a packet record may be considered invalid if there was no data received in a given slot.

As shown in FIGS. 4A and 4B, the TCAU 40 processes and extracts the parametric information with different functional blocks according to the features of the parametric information. At every slot boundary, a few bits of a system time reference are saved into the corresponding packet record to keep it time-stamped. Additionally, the preamble detector module of the physical layer receiver module 10 continually detects if a preamble signal belonging to one of the expected MAC indices is present in the received signal. If a preamble signal belonging to one of the expected MAC indices is detected, the "macidfound" signal is generated along with the associated MAC index that was detected. Since the presence of a preamble signal in a received slot indicates the start of a new packet for the forward link, the TCAU 40 uses the "macidfound" signal to generate the Start-of-Packet (SOP) indicator bit. This indicator is set only for the slots in which a preamble signal is detected, and reset for the slots in which no preamble signal is detected. The "macidfound" signal indicates that a MAC Index was found by the Preamble Module. The "fn_slot" signal indicates a slot boundary. The SOP indicator bit indicates the start of a packet (frame). 2 bits from the system time counter, denoted as "st_timestmp[1:0]", indicates the interlace number. Also a slot counter, denoted as "SlotCnt", corresponding to the ongoing interlace is reset to start from zero whenever a preamble is detected in the slot. The slot counter is incremented by one for every slot of the packet until the last slot of this packet is received, or the packet is declared to be successfully decoded by the physical layer receiver module 10. The packet complete indicator bit is set in the slot in which either of the two previous mentioned conditions is met. If no information in a slot is received, (i.e. no preamble detected), and no continuation of fragments of a previously ongoing packet, up until the end of the slot boundary marker, the packet record for the slot is declared to be invalid by the TCAU 40. Otherwise the packet record for the slot is declared to be valid with the "pkt_vld" indicator in the packet record. For the slots, in which a valid packet is found, the TCAU 40 determines if the information received in this packet is usable, i.e. if it is meant for the mobile station and is not redundant, and sets/resets a corresponding usable packet indicator, denoted as "info_vld", in the packet record. After extracting the parametric information, the TCAU 40 further assembles the parametric information in a compact 32-bit field of packet record, one for each of the four interlaces. In one embodiment, the packet record assembly unit may be a 32-bit bus which simply groups the parametric information together before storing it into the packet record buffers. In another embodiment, the packet record assembly unit may perform pre-processing of the parametric information before storing it into the packet record buffers. The subsequent processing modules can access the compact packet record to determine how it should proceed with the associated payload data and/or compute reception metrics about channel quality, packet error-rate, etc.

Figure 5:
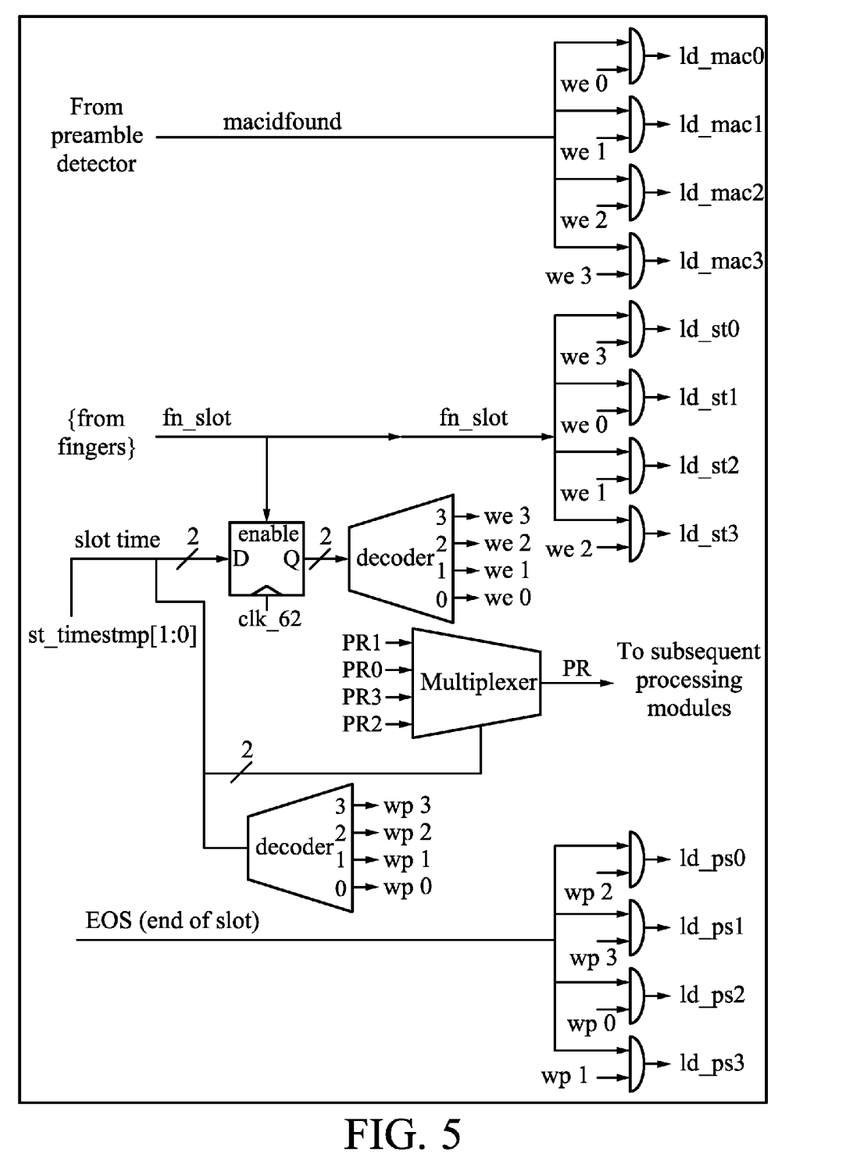
FIG. 5 is a block diagram illustrating an enable signal generator according to an embodiment of the invention.
Figure 6A:
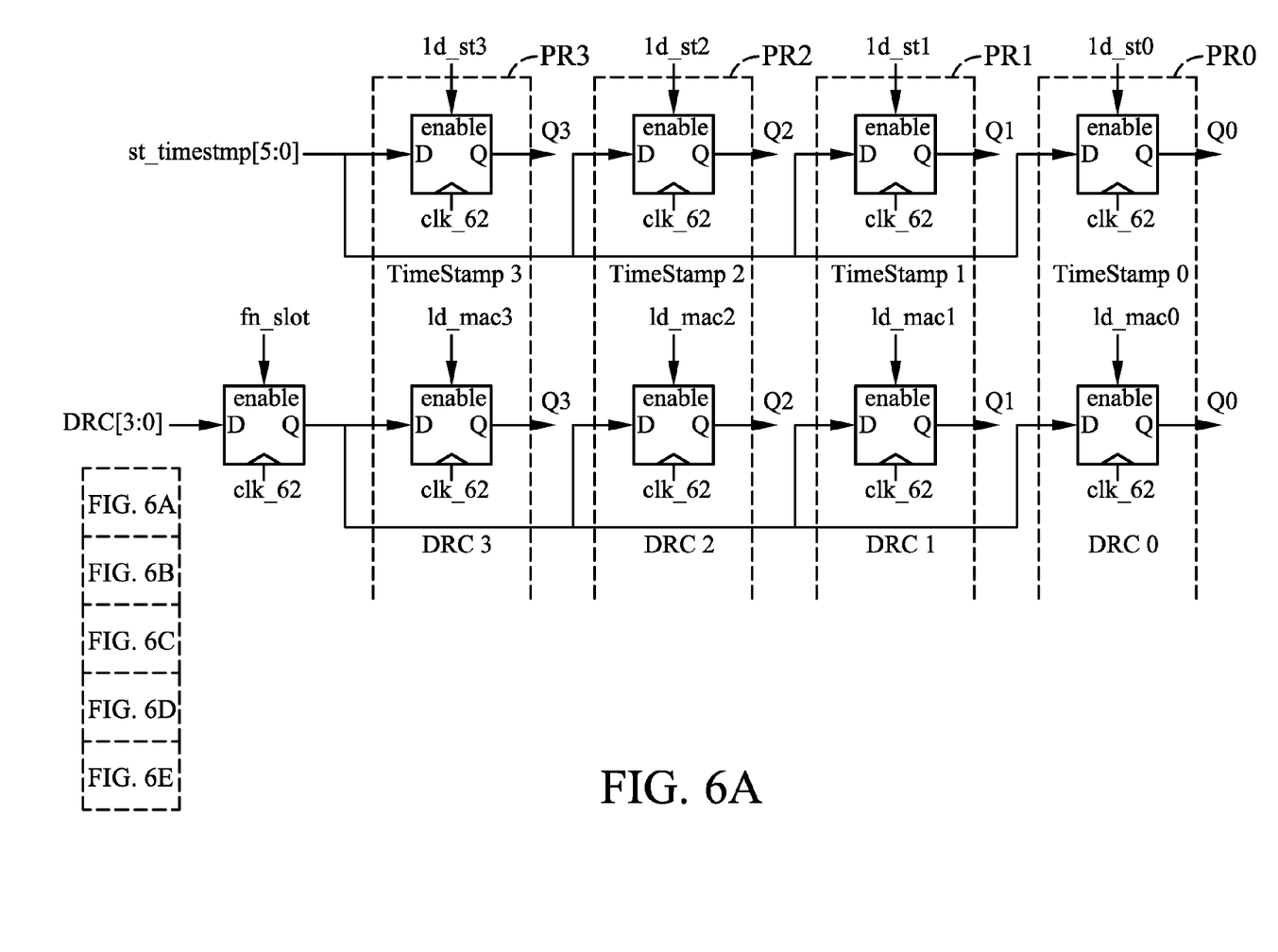
Figure 6B:
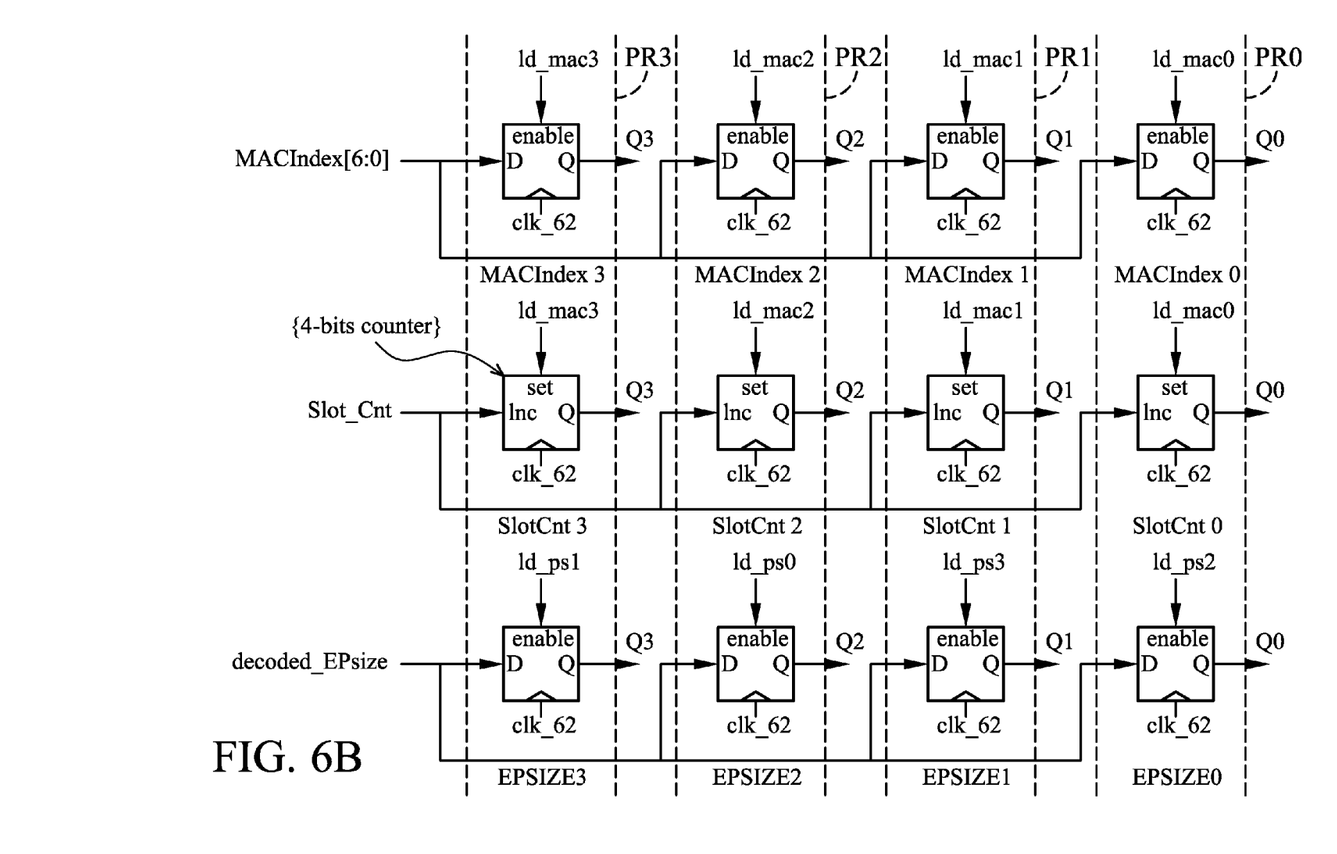
Figure 6C:
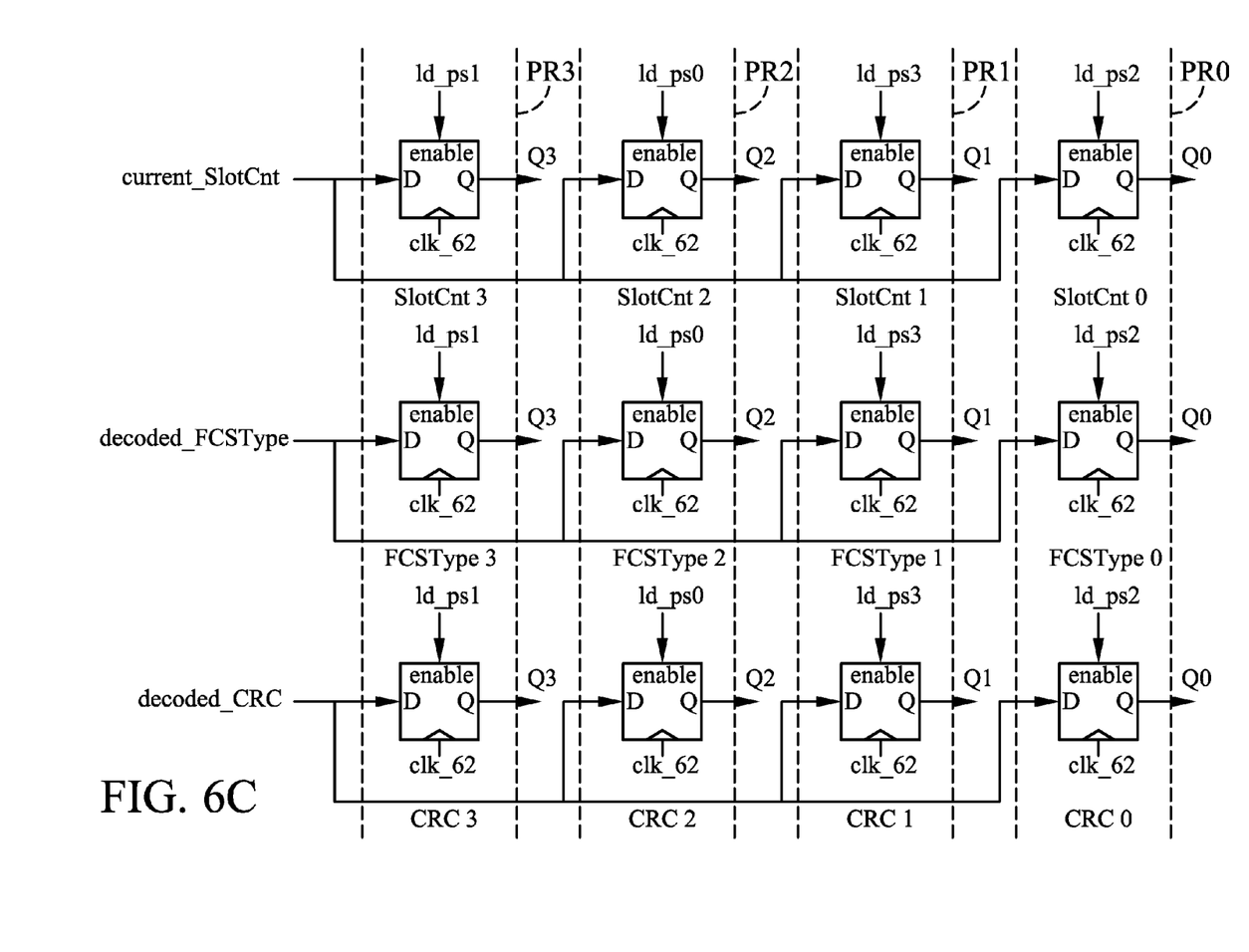
Figure 6D:
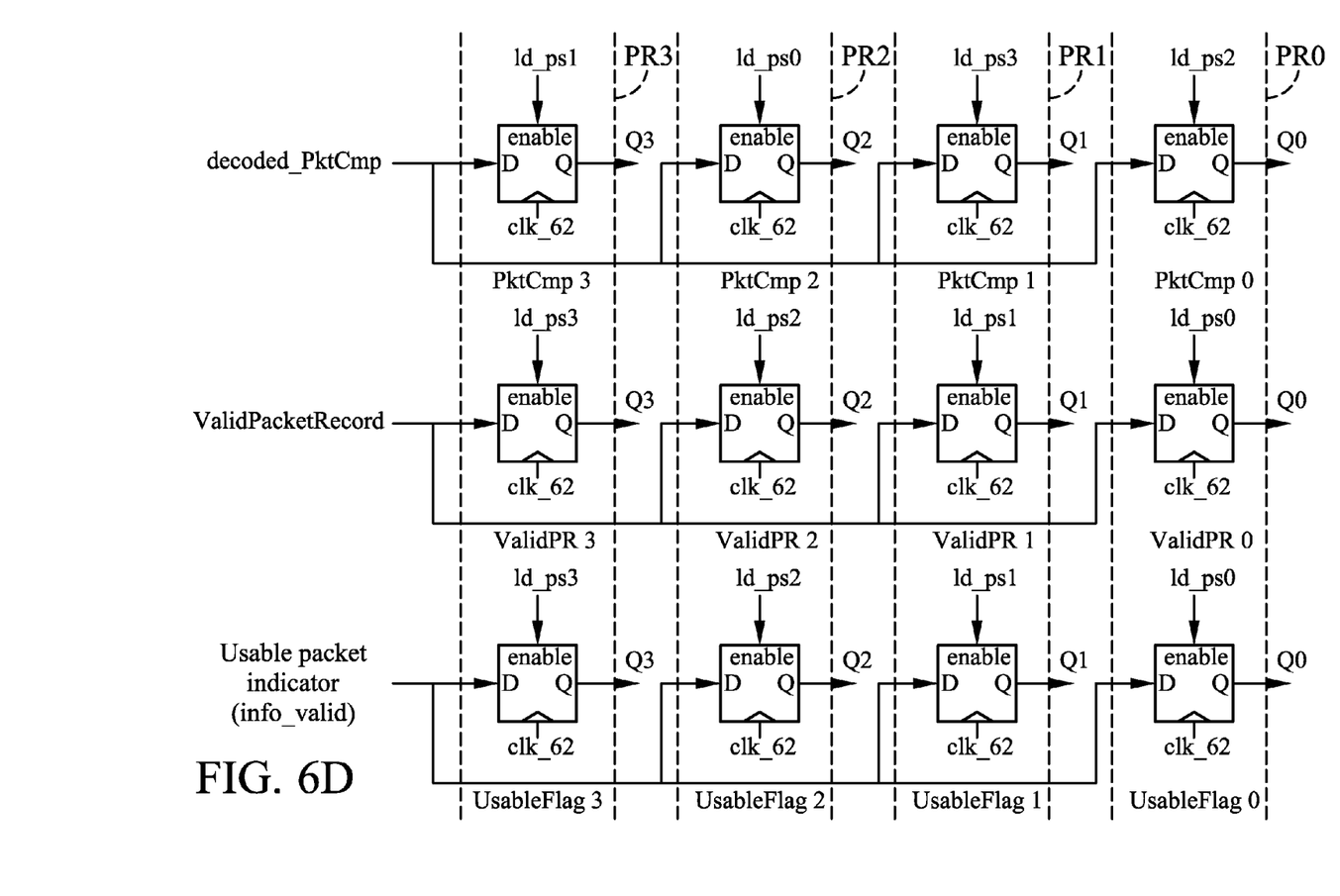
Figure 6E:
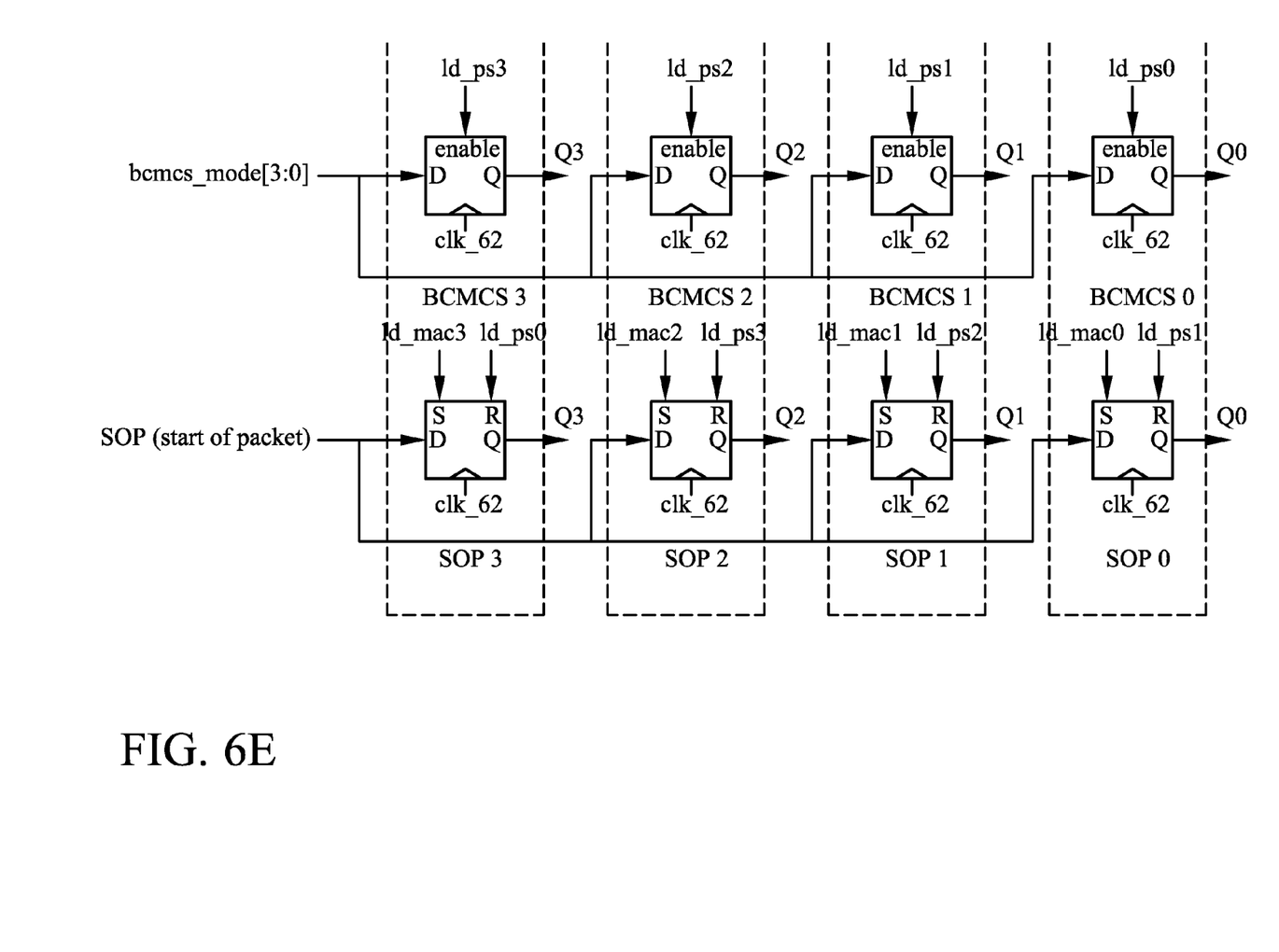

Note that necessary enable signals are generated by the enable signal generator 41 to help capture the various fields in a packet record. As shown in FIG. 5, a start of slot boundary signal, denoted as "fn_slot", is generated by the receiver and demodulator of the physical layer receiver module 10 based on system time reference. A pulse on the "macidfound" signal propagates to one of the "ld_mac" enable signals according to the interlace number. Similarly, the "ld_st" and "ldps" enable signals are generated according to the "fn_slot" and "EOS" (end of slot) indicators, respectively. In this embodiment, the "EOS" indicator is generated based on either a data ready indicator from the payload data decoder, or an end of slot boundary indicator obtained from the system time reference. In other embodiments, the "EOS" indicator may be generated differently. The different trigger signals are used to keep the saved parameters time-aligned despite different processing delays within the modules of the receiver 400 for extraction of different parametric information from the received signal. Note that, in this embodiment, there is a 2-slot delay between the time the data from the current slot of the packet is received and the time it is processed by the payload data decoder. Therefore, the trigger signals are accordingly time offset by 2 slots, as shown by the input arrangements of the Multiplexer and AND-gates to the "ld_st" and "ld_ps" enable signals in FIG. 5.

Figure 7:
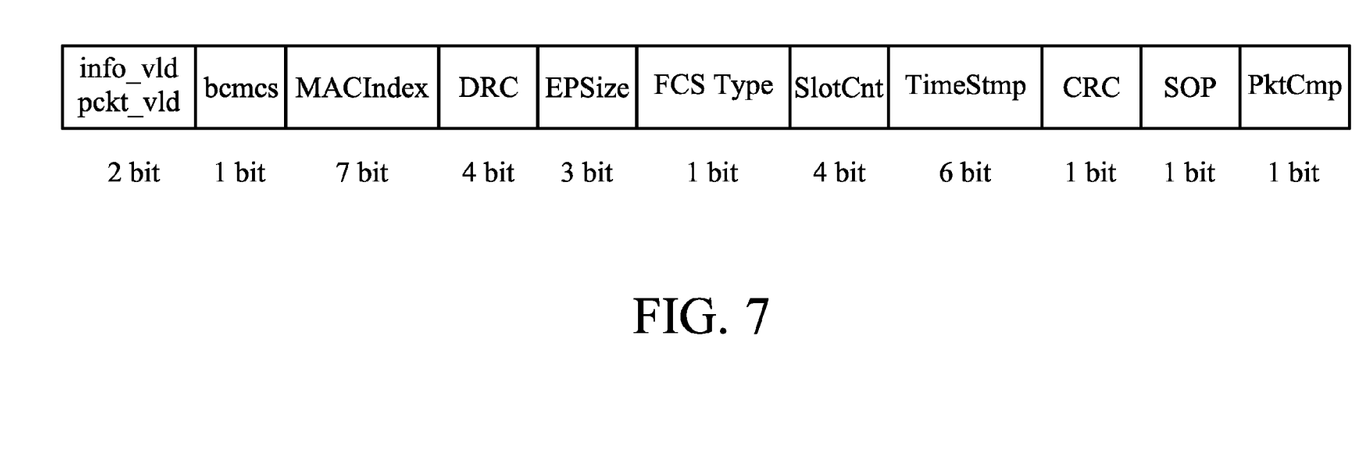
FIG. 7 is a block diagram illustrating the fields of a packet record according to an embodiment of the invention.

FIG. 6A to 6E is a block diagram illustrating the packet record buffers according to the embodiment shown in FIGS. 4A and 4B. In this embodiment, 4 packet record buffers are used to maintain the parametric information from the TCAU 40 for each interlace, and in each packet record buffer, several flip-flops and counters, controlled by the enable signals from the enable signal generator 41, serve as small memory units for storing the parametric information associated with the specific interlace number. The outputs, Q0 to Q3, of the flip-flops and counters represent the parametric information for interface 0 to interlace 3, which are further grouped together to form the compact packet records for each interlace, as shown in FIG. 7. Note that different fields in the packet record may be used according to specific implementation requirements and the associated data communications system. In another embodiment, the packet record buffers may use other types of storage medium, such as caches, registers, and others, instead of the flip-flops.

Figure 8:
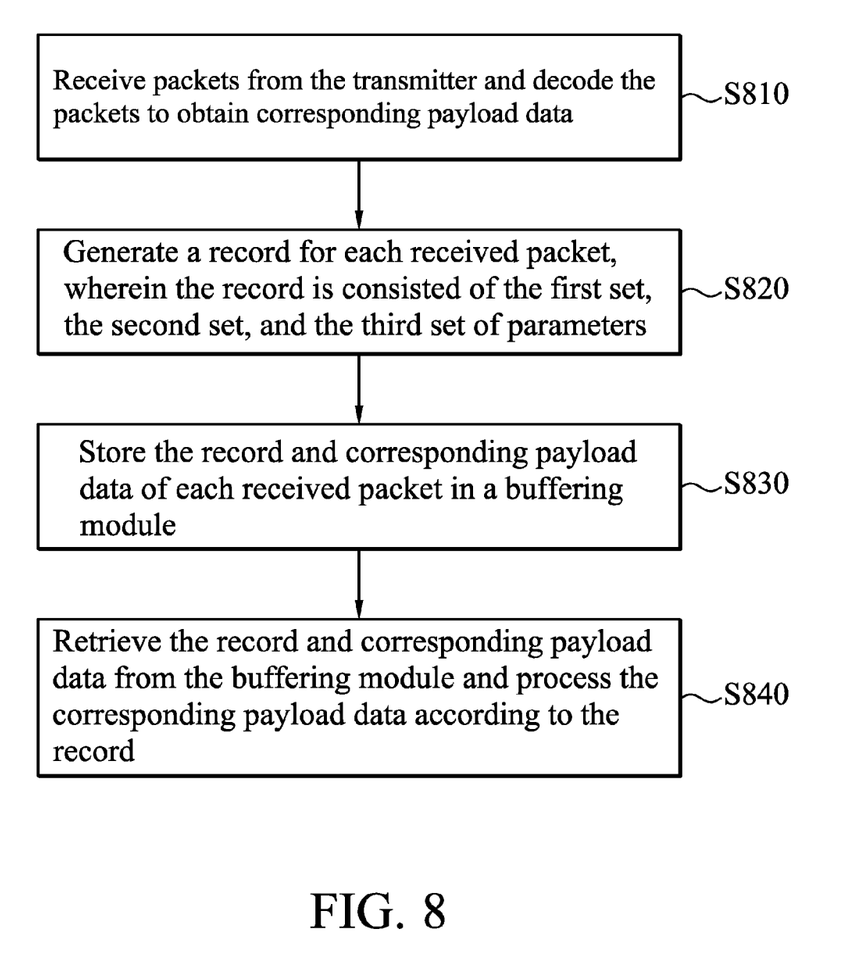
FIG. 8 is a flow chart illustrating the packet parameter maintenance method according to an embodiment of the invention.

FIG. 8 is a flow chart illustrating the packet parameter maintenance method according to an embodiment of the invention. Starting with step S810, a receiver receives packets from a transmitter and decodes the packets to obtain corresponding payload data, wherein each received packet is transmitted in accordance with a first set of parameters predetermined before decoding of the packets, a second set of parameters which are dynamically determined when the packets are being decoded, and a third set of parameters which are determined after the packets have been decoded. Generally, the step S810 is performed by a receiver module in the physical layer of the receiver. Once the packet decoding procedure is completed, step S820 is performed. In step S820, the receiver generates a record for each received packet, wherein the record comprises the first set, the second set, and the third set of parameters. Next, in step S830, the receiver stores the record and corresponding payload data of each received packet in a buffering module for temporary storage. Finally, in step S840, the subsequent processing modules of the receiver retrieve the record and corresponding payload data from the buffering module and process the corresponding payload data according to the record. Note that the receiver provides timing synchronization for the storing and retrieving of the record and corresponding payload data in step S830 and S840, respectively, so that all the parameters of each received packet are provided to the subsequent processing modules of the receiver as a centrally synchronized and compact unit. Thus, higher payload data throughputs are achieved by the receiver, and debugging in design or in layout/field-testing phase is simplified, due to the method of the invention.

While the invention has been described by way of example and in terms of preferred embodiment, it is to be understood that the invention is not limited thereto. Those who are skilled in this technology can still make various alterations and modifications without departing from the scope and spirit of this invention. For example, the applied data communications system may be a 1x CDMA 2000 system, an IEEE 802.11 a/b/g system, or an LTE system, etc. Therefore, the scope of the invention shall be defined and protected by the following claims and their equivalents.

What is claimed is:

1. A receiver for maintaining parameters of packets received from a transmitter, comprising:
    a first module for receiving packets from the transmitter and decoding the packets to obtain corresponding payload data, wherein each received packet is transmitted in accordance with a first set of parameters predetermined before decoding of the packets, a second set of parameters which are dynamically determined when the packets are being decoded, and a third set of parameters which are determined after the packets have been decoded, wherein the third set of parameters is further determined according to the first set and the second set of parameters;
    a record generating module for generating a record for each received packet, wherein the record comprises the first set, the second set, and the third set of parameters;
    a buffering module for storing the record and corresponding payload data of each received packet; and
    a second module for retrieving the record and corresponding payload data from the buffering module, and processing the corresponding payload data according to the record.

2. The receiver of claim 1, further comprising a synchronization module for providing timing synchronization for the storing step and the retrieving step.

3. The receiver of claim 1, wherein the buffering module comprises a plurality of flip-flops, and each of the flip-flops stores one parameter of the first set, the second set, and the third set of parameters.

4. The receiver of claim 1, wherein the first set of parameters comprises at least one of the following parameters:
   a system time reference; and
   a data rate format of corresponding packet.

5. The receiver of claim 4, wherein the record generating module keeps the data rate format the same across all fragments of the corresponding packet.

6. The receiver of claim 1, wherein the second set of parameters comprises at least one of the following parameters:
   a media access control (MAC) index;
   a fragment number within corresponding packet;
   a forward checksum (FCS) type;
   information of whether corresponding packet is a broadcast or multicast; and
   information of whether start of a packet is detected.

7. The receiver of claim 1, wherein the third set of parameters comprises at least one of the following parameters:
   a status indication of the decoding of corresponding packet; and
   a quality indication of the receiving of corresponding packet.

8. The receiver of claim 7, wherein the quality indication comprises a validity flag of corresponding packet, and the second module retrieves a null packet if the validity flag is set to false.

9. The receiver of claim 7, wherein the status indication comprises at least one of the following parameters:
   information of whether a cyclic redundancy check (CRC) of corresponding packet has passed or failed;
   information of whether a packet span of corresponding packet is completed;
   information of a size of corresponding packet; and
   information of whether corresponding packet is redundant or whether corresponding packet is meant for a user of the receiver.

10. A method for a receiver to maintain parameters of packets received from a transmitter, comprising:
    receiving packets from the transmitter and decoding the packets to obtain corresponding payload data, by a receiving module, wherein each received packet is transmitted in accordance with a first set of parameters predetermined before decoding of the packets, a second set of parameters which are dynamically determined when the packets are being decoded, and a third set of parameters which are determined after the packets have been decoded, wherein the third set of parameters is further determined according to the first set and the second set of parameters;
    generating a record for each received packet, wherein the record comprises the first set, the second set, and the third set of parameters;
    storing the record and corresponding payload data of each received packet; and
    retrieving the record and corresponding payload data and processing the corresponding payload data according to the record, by at least one subsequent processing module.

11. The method of claim 10, further comprising providing timing synchronization for the storing step and the retrieving step.

12. The method of claim 10, wherein the record is stored in a plurality of flip-flops, and each of the flip-flops stores one parameter of the first set, the second set, and the third set of parameters.

13. The method of claim 10, wherein the first set of parameters comprises at least one of the following parameters:
    a system time reference; and
    a data rate format of corresponding packet.

14. The method of claim 13, further comprising keeping the data rate format the same across all fragments of the corresponding packet.

15. The method of claim 10, wherein the second set of parameters comprises at least one of the following parameters:
    a media access control (MAC) index;
    a fragment number within corresponding packet;
    a forward checksum (FCS) type;
    information of whether corresponding packet is a broadcast or multicast; and
    information of whether start of a packet is detected.

16. The method of claim 10, wherein the third set of parameters comprises at least one of the following parameters:
    a status indication of the decoding of corresponding packet; and
    a quality indication of the receiving of corresponding packet.

17. The method of claim 16, wherein the quality indication comprises a validity flag of corresponding packet, and the second module retrieves a null packet if the validity flag is set to false.

18. The method of claim 16, wherein the status indication comprises at least one of the following parameters:
    information of whether a cyclic redundancy check (CRC) of corresponding packet has passed or failed;
    information of whether a packet span of corresponding packet is completed;
    information of a size of corresponding packet; and
    information of whether corresponding packet is redundant or whether corresponding packet is meant for a user of the receiver.

* * * * *